(12) United States Patent
Ooi et al.

(10) Patent No.: US 8,844,712 B2
(45) Date of Patent: Sep. 30, 2014

(54) LINK OR A CONVEYOR CHAIN, A CONVEYOR CHAIN MADE UP OF SAID LINKS AND A METHOD FOR OPERATION OF SAID CONVEYOR CHAIN

(75) Inventors: Bok Leong Ooi, Island Park (MY); Johnny Teik Chuan Yew, Island Glades (MY)

(73) Assignee: Flexmove System (M) Sdn. Bhd., Penang (MY)

( * ) Notice: Subject to any disclaimer, the term of this patent is extended or adjusted under 35 U.S.C. 154(b) by 0 days.

(21) Appl. No.: 13/990,934

(22) PCT Filed: May 9, 2012

(86) PCT No.: PCT/MY2012/000099
§ 371 (c)(1),
(2), (4) Date: May 31, 2013

(87) PCT Pub. No.: WO2012/154030
PCT Pub. Date: Nov. 15, 2012

(65) Prior Publication Data
US 2014/0054141 A1      Feb. 27, 2014

(30) Foreign Application Priority Data

May 10, 2011    (MY) .......................... PI 2011002078

(51) Int. Cl.
| *B65G 17/08* | (2006.01) |
| *F16G 13/10* | (2006.01) |
| *B65G 17/40* | (2006.01) |
| *B65G 21/22* | (2006.01) |
| *B65G 15/30* | (2006.01) |

(52) U.S. Cl.
CPC ................ *B65G 15/30* (2013.01); *F16G 13/10* (2013.01); *B65G 17/40* (2013.01); *B65G 21/22* (2013.01); *B65G 17/086* (2013.01)
USPC .......................................... 198/838; 198/852

(58) Field of Classification Search
USPC .......... 198/778, 779, 838, 850, 851, 852, 853
See application file for complete search history.

(56) References Cited

U.S. PATENT DOCUMENTS

| 1,933,554 | A | * | 11/1933 | Holmes .................... 198/836.1 |
| 3,627,109 | A | * | 12/1971 | Cabak ............................ 198/840 |
| 3,944,059 | A | * | 3/1976 | Garvey .......................... 198/850 |
| 4,645,070 | A | | 2/1987 | Homeier |
| 4,852,722 | A | | 8/1989 | Houseman |
| 5,027,944 | A | * | 7/1991 | Damkjaer ..................... 198/852 |
| 5,076,422 | A | * | 12/1991 | Clopton ......................... 198/838 |
| 5,697,492 | A | * | 12/1997 | Damkjær ...................... 198/852 |
| 5,803,236 | A | * | 9/1998 | Wahren ......................... 198/852 |
| 6,585,110 | B2 | * | 7/2003 | Layne et al. .................. 198/852 |
| 6,666,327 | B2 | * | 12/2003 | Kilby et al. ................... 198/852 |
| 7,556,142 | B2 | | 7/2009 | Stebnicki et al. |
| 8,448,781 | B2 | * | 5/2013 | Morris .......................... 198/852 |
| 2010/0089724 | A1 | | 4/2010 | Broers et al. |

FOREIGN PATENT DOCUMENTS

| EP | 0 462 336 A1 | 12/1991 |
| WO | WO 2012/054030 | 11/2012 |

OTHER PUBLICATIONS

International Search Report issued in International Application No. PCT/MY2012/000099, dated Jan. 31, 2013.
Malaysian Adverse Report mailed Apr. 30, 2014.

* cited by examiner

*Primary Examiner* — Mark A Deuble
(74) *Attorney, Agent, or Firm* — Hershkovitz & Associates, PLLC; Abraham Hershkovitz

(57) ABSTRACT

A conveyor chain link a main body, a top plate to which a handling product or part thereof is restable thereupon; said main body having a front portion and a rear portion; said front portion and rear portion having means to be interconnected such that one link can be connectable to another in order for the establishment of a multi-linked conveyor chain; a first guide member arrangement including a pair of rotably-supported laterally extending on opposing sides of an underneath side of said top plate, adapted to roll in the direction of movement of said conveyor chain, wherein said rollers of the first guide member arrangement are adapted to rest and rotate along a corresponding top face of a wear strip as part of a conveyor assembly support structure for the conveyor chain; a second guide member arrangement, including two rotably-supportable guide members on opposing sides of said main body, rotably about a longitudinal axis, perpendicular to the top plate, wherein the peripheral edge of the respective guide members are adapted to engage a side edge of a wear strip face of the conveyor support assembly or a similar such configured structure arrangement of said conveyor support assembly; a third guide member arrangement, including a roller member adapted to rest and rotate upon a conveyor bed of the conveyor assembly support or other similar structure of the conveyor support assembly, wherein said roller of the third guide member arrangement is laterally rotatably-supported by an axis substantially in parallel to the top plate; such that the first, second and third guide member arrangements can work independently or in combination to reduce frictional force between the contact positions of the conveyor chain with the conveyor chain support assembly, resulting in a reduced level of power required to drive the conveyor chain upon the conveyor support assembly during operation, along with reduced wear and tear of the link against the conveyor support assembly.

16 Claims, 4 Drawing Sheets

LINK OR A CONVEYOR CHAIN, A CONVEYOR CHAIN MADE UP OF SAID LINKS AND A METHOD FOR OPERATION OF SAID CONVEYOR CHAIN

This invention relates to a link for a conveyor chain, which is adapted to be interconnected to form a conveyor chain.

More particularly, this invention relates to a unique inventive conveyor chain link, which when interconnected and used within a conveyor system, is able to significantly reduce frictional forces between engaging components, which not only leads to reduced wear and tear of respective parts making up the arrangement, but allows for the use of a significantly less power driving motor.

DISCUSSION OF THE PRIOR ART

During a conventional operation of a conveyor chain or belt, it is normally supported with an assembly structure wherein the conveyor chain is made up of a plurality of pivotally interconnected chain links that through a drive mechanism is able to move in both forward and reverse directions.

The person skilled in the art will realise that conveyor chains and belts have become particularly sophisticated these days, being required not only to transport product horizontally, but often there is now the requirement to also introduce significant inclination and curvature into the overall structure of the conveyor assembly, so that the conveyor chain can pass around various plant equipment, handling locations, operational points inside an industrial workplace and helical framework to be elevated or lowered to a respective level.

With such stress of design being placed upon the modern day conveyor chain arrangement, there is the requirement to have an effective guide mechanism so that the actual carrying plate of the chain can be rolled in its preferred direction.

For the most part, this means that the conveyor chain or belt is sliding along a wear strip during conveyor movement. The resistance experienced by the chain in conveyor movement is often the result of frictional forces between the link and the wear strip face and edge upon the guides and/or support for the conveyor chain, along with frictional forces against radial-directed guide surfaces at bends and at curvature points along the length of the conveyor assembly.

Not only are there the frictional forces acting upon the engaging surfaces, which requires forces to be overcome, notably in the application of motors with higher power ratings, there is also the unsatisfactory wear and tear between the relevant components, which the person skilled in the art will appreciate often causes production to be suspended for various maintenance and replacements of parts.

Therefore, any apparatus, means or method in which a reduction in frictional contact forces and the associated wear and tear between the components of the moving parts of the conveyor system would be most welcomed.

Therefore, it is an object of this invention to provide an improved conveyor chain link, which is adapted to be interconnected with other such similar links in order to provide a conveyor chain, which when in operation upon a conveyor support assembly, there will be significant reductions in the frictional forces between the conveyor link and the various wear strips and/or conveyor beds supporting the conveyor chain, resulting in the requirement for reduced operating power consumption of such conveyor chains and also significant improvement in the wear and tear of such conveyor chain that would be otherwise expected from a comparable conveyor chain, which should advantageously lead to reduced maintenance and replacement of parts associated with the chain.

Further objects and advantages will become apparent from the complete reading of this specification.

SUMMARY OF THE INVENTION

In one form of the invention, there is provided a conveyor chain link adapted to be interconnected with other such links forming a conveyor chain, said link including:
  a main body,
  a top plate to which a handling product or part thereof is restable thereupon;
  said main body having a front portion and a rear portion;
  said front portion and rear portion having means to be interconnected such that one link can be connectable to another in order for the establishment of a multi-linked conveyor chain;
  a first guide member arrangement including a pair of rotably-supported laterally extending on opposing sides of an underneath side of said top plate, adapted to roll in the direction of movement of said conveyor chain, wherein said rollers of the first guide member arrangement are adapted to rest and rotate along a corresponding top face of a wear strip as part of a conveyor assembly support structure for the conveyor chain;
  a second guide member arrangement, including two rotably-supportable guide members on opposing sides of said main body, rotably about a longitudinal axis, perpendicular to the top plate, wherein the peripheral edge of the respective guide members are adapted to engage a side edge of a wear strip face of the conveyor support assembly or a similar such configured structure arrangement of said conveyor support assembly;
  a third guide member arrangement, including a roller member adapted to rest and rotate upon a conveyor bed and/or wear strip of the conveyor assembly support or other similar structure of the conveyor support assembly, wherein said roller of the third guide member arrangement is laterally rotatably-supported by an axis substantially in parallel to the top plate;
  such that the first, second and third guide member arrangements can work independently or in combination to reduce frictional force between the contact positions of the conveyor chain with the conveyor chain support assembly, resulting in a reduced level of power required to drive the conveyor chain upon the conveyor support assembly during operation, along with reduced wear and tear of the link against the conveyor support assembly.

An advantage of such an arrangement is that rather than utilising traditional means in order to support and guide a conveyor chain within a conveyor support assembly for the use of sliding upon a wear strip face and so forth, in this invention three purposely-configured guide member arrangements have been introduced in order to eliminate a sliding interaction between the relevant components to be replaced by rotatable roller movement, thereby significantly reducing frictional forces upon engaging parts, which means less power is required to drive the conveyor chain's motion and also as wear and tear has been significantly reduced as parts are no longer sliding against one another, but through the use of the rollers are able to roll past without significant friction, means that the actual down time during the use of such a conveyor chain operation is significantly reduced.

In preference, the first guide member arrangement including the pair of rotatably-supported rollers are of a cylindrical configuration.

In preference, the size of cylindrical rollers is comparable to the dimensions of the wear strip, which forms part of the conveyor chain support assembly, to which the pair of rollers of the first guide member arrangement will rest thereupon.

In preference, each of the cylindrical rollers is rotatably-supported in defined slots located on the underside top forward corners of the top plate of the conveyor link.

An advantage of such an arrangement is that by introducing slots into the link, the respective cylindrical rollers can be safely housed, partially inside with the protruding portion of the cylindrical rollers then being able to fully rotate and move along the wear strip face during conveyor movement, but keeping the chain itself in close proximity to the conveyor support assembly so no gaps of significance are created.

In preference, the cylindrical rollers may be made of plastic, steel or of a suitable bearing arrangement or material.

In preference, the second guide member arrangement, including the two rollers positioned on the respective sides of the support section, to which the top plate rest thereupon, are of a substantial wheel or castor configuration.

In preference, each wheel is rotatable about a longitudinal axis, such that the peripheral edge of the wheel can engage sideon with the corresponding wear strip and/or guide of the conveyor support assembly.

In preference, the breadth or thickness of the wheel or castor of the roller for the second guide member arrangement is of a dimension relative to the degree of control required during curvature or rotating movement of the conveyor chain during operation.

In preference, the top plate support section includes two slots located centrally to the front and rear portions of the top plate support sections for the conveyor link, wherein the external slots in this central position of the top plate support section on respective sides allows a portion of each of the wheels or castors to protrude therefrom.

An advantage of such an arrangement is that, just like the rollers with first guide member arrangement, these wheels or castors can be conveniently housed inside the link, from the main body portion responsible for supporting the top plate.

In preference, the roller for the third guide member arrangement is a wheel or castor.

In preference, the wheel or castor is supported upon a moveable lateral axis so that the link, when interconnected from a conveyor chain is adapted to turn and rotate around as required.

In preference, the top plate includes an upper surface, wherein one side across the breadth of the top plate is at a higher elevation.

In preference, there is a central fold or incline between a dividable side of the top plate.

In preference, the divide is an incline wherein one side is raised higher or lower relative to the other.

In preference, the top plate has a lower forward side elevation relative to the back or rear side of the top plate.

Advantageously, by having the introduction of the incline fold dividing the top plate into upper and lower decks means that an adjacent interconnecting link can have its raised upper deck rest or be positioned substantially above or upon the lower deck of the forward side of the top plate of an adjacent link.

Advantageously, this unique arrangement allows for overlapping of the links during turning and bending when any general curvature movement of the conveyor chain is required as it makes its way throughout its required material handling direction upon the supporting conveyor chain assembly.

In preference, the main body top plate support section front end includes a closed-off slot, to which a rod can pass through to rotatably support the guide wheel of the third guide member arrangement, wherein the lateral configured slot will allow the wheel or castor to turn as required during curvature movement of the conveyor chain during operation.

In preference, the rod insertable into the lateral slot of the front portion of the main body top plate support section at its external distal ends is also adapted to rest and being enclosed in corresponding chambers that protrude out from respective sides at the rear portion of the main body of the top plate support section.

Advantageously, the interconnection means of bringing multiple links together can act as the rotational axis support for the guide wheel that is formed as part of the third guide member arrangement, but at the same time utilise the distal ends of this rod to be positioned within the rear portion of the main body, which is supporting the top plate in an adjacent link.

In order now to describe the invention in greater detail, a series of illustrations and preferred embodiments will be presented herewith.

BRIEF DESCRIPTION OF THE ILLUSTRATIONS

FIG. 5a shows a schematic three-dimensional view of part of the conveyor chain being supported within a conveyor chain support assembly, wherein FIG. 5b is an exploded portion of part of FIG. 5a.

DETAILED DESCRIPTION OF THE ILLUSTRATIONS

Figure 1:
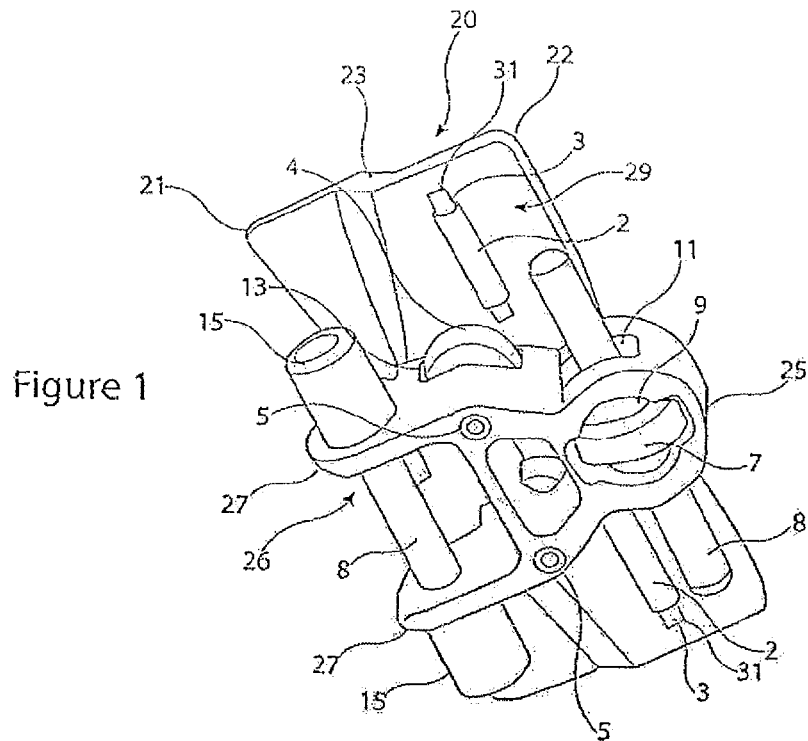
FIG. 1 shows a bottom perspective view of a chain link in one preferred embodiment of the invention.
Figure 2:
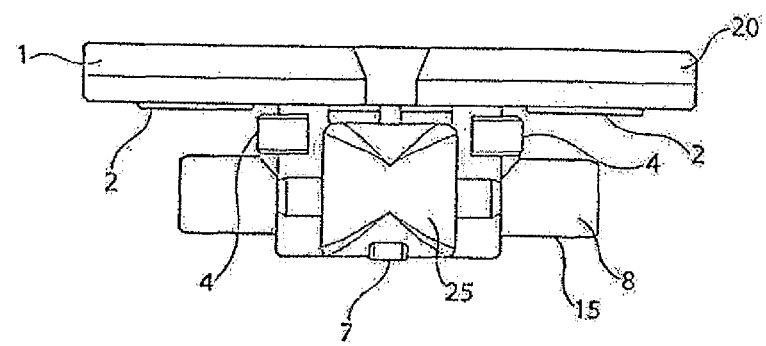
FIGS. 2 and 3 are respective front and side views of the chain link of the preferred embodiment referred to in FIG. 1.
Figure 3:
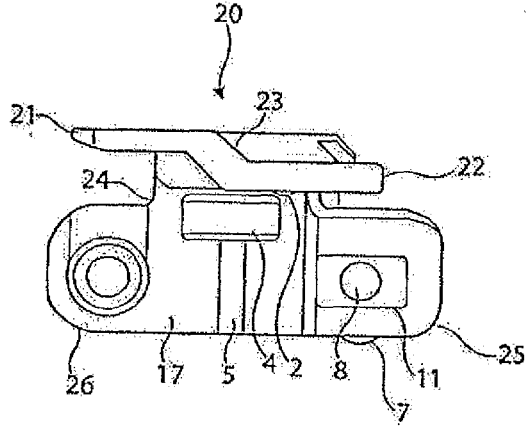
Figure 4:
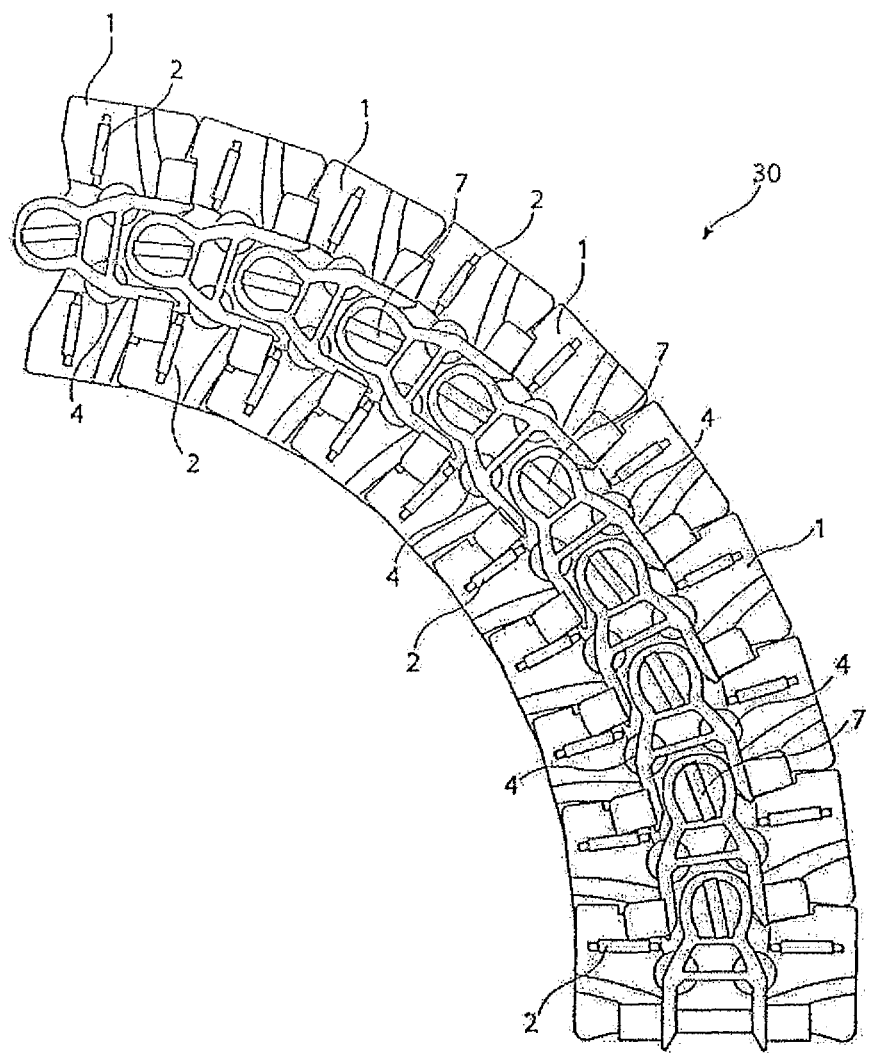
FIG. 4 shows a top schematic view of a conveyor chain interconnecting the conveyor link of FIGS. 1-3.
Figures 5A, 5B:
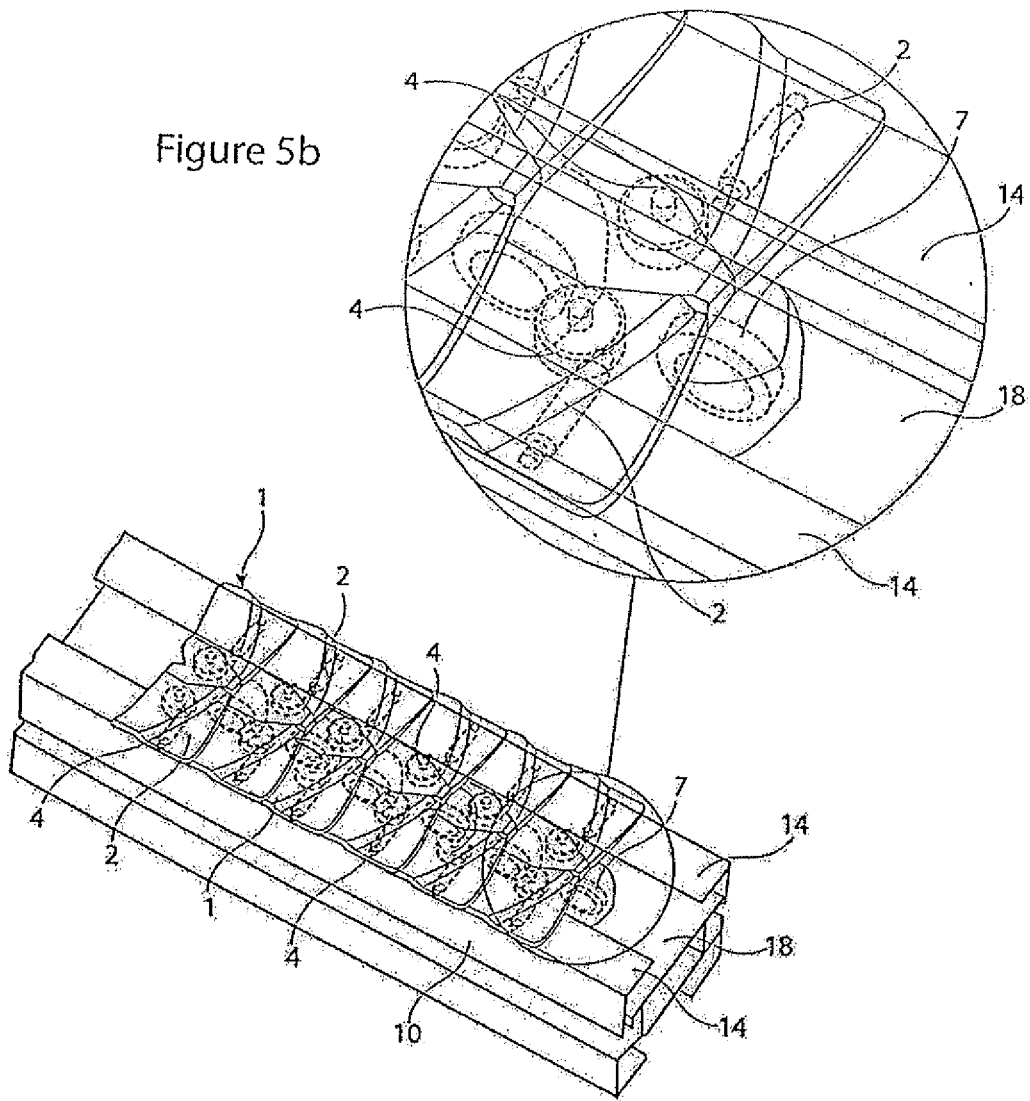

Referring to the drawings now in greater detail, wherein a link, shown generally as 1, is adapted to interconnected to form a conveyor chain, as shown best in FIG. 4, generally as 30.

The link 1 includes a top plate, shown generally as 20, which is divided into a front portion 22 and a rear portion 21, wherein the respective front and rear portions are elevated differentially by the inclined or fold 23.

As is can be envisaged, the elevation differences between the forward or front side 22 and the rear or back side 21, brought about by the inclined 23 means that an adjacent link can have the raised rear or back side or portion 21 positionable over or upon the lowered forward side 22, so that during times of curvature movement of the conveyor chain upon a conveyor support assembly, there will be an allowed degree of rotation, which as partially shown in FIG. 4, can lead to a continual rotation of a complete 360 degrees for a conveyor chain made of such interconnecting links working its way up an helical structure.

The top plate 20 is supported by a main body support section, shown generally as 24, which includes a front portion 25 and a rear portion 26 and a central portion 17.

The front portion 25 includes a lateral slot 11, to which rod 8 can pass through in order to act as a rotatable support for guide wheel 7.

Figure 6:
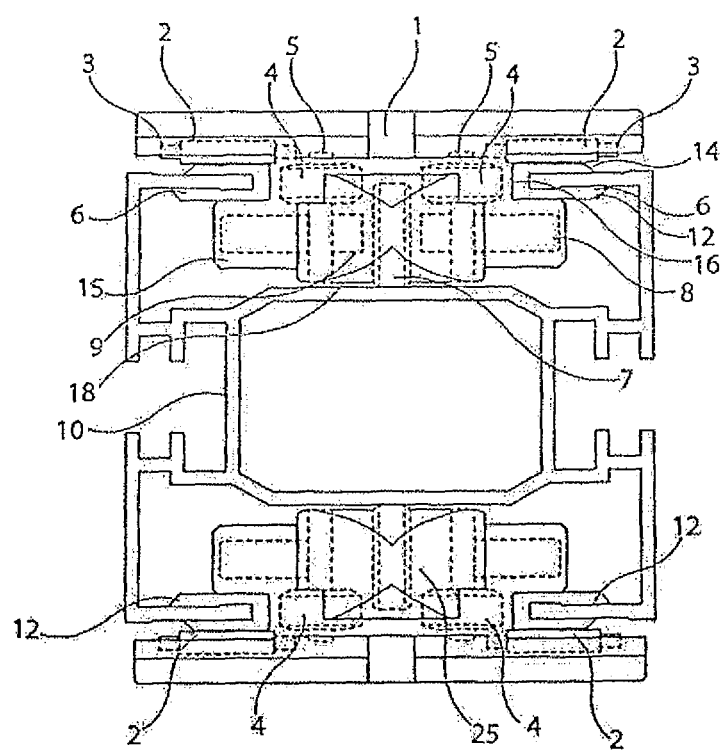
FIG. 6 is a cross-sectional view of a conveyor chain, made up of the links shown in FIGS. 1-3, upon a conveyor chain support assembly.

The guide wheel 7, as seen in FIG. 6, is adapted to move along the conveyor support assembly 10, bed 18.

The central portion 17 of the main body support section 24 of the link 1 also includes two lateral slots 13, on either side of the central portion 17, to which rotatably supported therein by virtue of rotatably pivot pins 5 are guide rollers 4, which as best seen in FIG. 6, are adapted to engage the side section 16 of the wear strips 12, which are included as part of the conveyor support assembly.

The guide wheels or rollers 4, have significant importance when the conveyor is involved in curvature turns throughout the length of the conveyor support assembly.

The underside 29 of the top plate 20 in substantial forward corners, include rollers 2, which are cylindrical-type rollers, which are rotatably-supported by rods 3, which are positioned inside respective slots 31 within the underside 29 of the top plate 20.

As per seen in FIG. 6, these cylindrical rollers 2 are adapted to roll along and engage the upper surface 14 of the wear strip 12 as the conveyor chain makes its way across the structured conveyor support assembly.

The rear portion 26 of the main body support frame 24 for the top plate 20 has two prongs or fingers 27, where extending therefrom are barrels or chambers 15, which are able to interconnect an adjacent link by containing a corresponding rod 8, which is supporting the front guide wheel 7 upon the conveyor bed 18.

The invention claimed is:

1. A conveyor chain link adapted to be interconnected with other such links forming a conveyor chain, said link including:
   a main body, a top plate on which a handling product or part thereof rests thereupon; said main body having a front portion and a rear portion; said front portion and rear portion having means to be interconnected such that one link can be connectable to another in order for the establishment of a multi-linked conveyor chain;
   a first guide member arrangement including a pair of rotatably supported, laterally extending rollers on opposing sides of an underneath side of said top plate, adapted to roll in the direction of movement of said conveyor chain, wherein said rollers of the first guide member arrangement are adapted to rest and rotate along a corresponding top face of a wear strip as part of a conveyor assembly support structure for the conveyor chain;
   a second guide member arrangement, including two rotatably supportable guide members on opposing sides of said main body, rotatably about a longitudinal axis, perpendicular to the top plate, wherein the peripheral edge of the respective guide members are adapted to engage a side edge of a wear strip face of the conveyor support assembly or a similar such configured structure arrangement of said conveyor support assembly;
   a third guide member arrangement, including a roller member adapted to rest and rotate upon a conveyor bed of the conveyor assembly support or other similar structure of the conveyor support assembly, wherein said roller of the third guide member arrangement is laterally and rotatably supported by an axis substantially in parallel to the top plate;
   wherein the first, second and third guide member arrangements can work independently or in combination to reduce frictional force between the contact positions of the conveyor chain with the conveyor chain support assembly, resulting in a reduced level of power required to drive the conveyor chain upon the conveyor support assembly during operation, along with reduced wear and tear of the link against the conveyor support assembly;
   wherein the roller for the third guide member arrangement is a wheel or castor; and
   wherein the wheel or castor is supported upon a moveable lateral axis so that the link, when interconnected from a conveyor chain is adapted to turn and rotate around as required.

2. The conveyor chain link of claim 1 wherein the first guide member arrangement including the pair of rotatably supported rollers are of a cylindrical configuration.

3. The conveyor chain link of claim 2 wherein the size of cylindrical rollers is comparable to the dimensions of the wear strip, which forms part of the conveyor chain support assembly, to which the pair of rollers of the first guide member arrangement will rest thereupon.

4. The conveyor chain link of claim 3 wherein each of the cylindrical rollers is rotatably supported in defined slots located on the underside top forward corners of the top plate of the conveyor link.

5. The conveyor chain link of claim 4 wherein the cylindrical rollers may be made of plastic, steel or of a suitable bearing arrangement or material.

6. The conveyor chain link of claim 1 wherein the second guide member arrangement, including the two rollers positioned on the respective sides of the main body, on which the top plate rests thereupon, are of a substantial wheel or castor configuration.

7. The conveyor chain link of claim 6 wherein each wheel is rotatable about a longitudinal axis, such that the peripheral edge of the wheel can engage with the corresponding wear strip and/or guide of the conveyor support assembly.

8. The conveyor chain link of claim 7 wherein the breadth or thickness of the wheel or castor of the roller for the second guide member arrangement is of a dimension relative to the degree of control required during curvature or rotating movement of the conveyor chain during operation.

9. The conveyor chain link of claim 8 wherein the main body includes two slots located centrally to the front and rear portions of the main body for the conveyor link, wherein the external slots in this central position of the main body on respective sides allows a portion of each of the wheels or castors to protrude therefrom.

10. The conveyor chain link of claim 1 wherein the top plate includes an upper surface, wherein one side across the breadth of the top plate is at a higher elevation.

11. The conveyor chain link of claim 10 wherein there is a central fold or incline between a dividable side of the top plate.

12. The conveyor chain link of claim 11 wherein the divide is an incline wherein one side is raised higher or lower relative to the other.

13. The conveyor chain of claim 12 wherein the top plate has a lower forward side elevation relative to the back or rear side of the top plate.

14. A conveyor chain link adapted to be interconnected with other such links forming a conveyor chain, said link including:
   a main body, a top plate on which a handling product or part thereof rests thereupon; said main body having a front portion and a rear portion; said front portion and rear portion having means to be interconnected such that one link can be connectable to another in order for the establishment of a multi-linked conveyor chain;

a first guide member arrangement including a pair of rotatably supported, laterally extending rollers on opposing sides of an underneath side of said top plate, adapted to roll in the direction of movement of said conveyor chain, wherein said rollers of the first guide member arrangement are adapted to rest and rotate along a corresponding top face of a wear strip as part of a conveyor assembly support structure for the conveyor chain;

a second guide member arrangement, including two rotatably supportable guide members on opposing sides of said main body, rotatably about a longitudinal axis, perpendicular to the top plate, wherein the peripheral edge of the respective guide members are adapted to engage a side edge of a wear strip face of the conveyor support assembly or a similar such configured structure arrangement of said conveyor support assembly;

a third guide member arrangement, including a roller member adapted to rest and rotate upon a conveyor bed of the conveyor assembly support or other similar structure of the conveyor support assembly, wherein said roller of the third guide member arrangement is laterally and rotatably supported by an axis substantially in parallel to the top plate;

wherein the first, second and third guide member arrangements can work independently or in combination to reduce frictional force between the contact positions of the conveyor chain with the conveyor chain support assembly, resulting in a reduced level of power required to drive the conveyor chain upon the conveyor support assembly during operation, along with reduced wear and tear of the link against the conveyor support assembly; and wherein the front end of the main body includes a closed-off slot, to which a rod can pass through to rotatably support the guide wheel of the third guide member arrangement, wherein the lateral configured slot will allow the wheel or castor to turn as required during curvature movement of the conveyor chain during operation.

15. The conveyor chain link of claim 14 wherein the rod insertable into the lateral slot of the front portion of the main body at its external distal ends is also adapted to rest and being enclosed in corresponding chambers that protrude out from respective sides at the rear portion of the main body.

16. A conveyor chain made up of interconnected links according to claim 14.

* * * * *